US007955505B2

(12) United States Patent
Mendes et al.

(10) Patent No.: US 7,955,505 B2
(45) Date of Patent: Jun. 7, 2011

(54) METHOD FOR REMOVING POLLUTANTS FROM PRODUCED WATER

(75) Inventors: Leonardo Brantes Bacellar Mendes, Riode Janeiro (BR); Paulo Cesar Rodrigues Cunha, Riode Janeiro (BR); Marcelo Gonçalves Montes D'oca, Rio Grande do Sul (BR); Paulo César Abreu, Rio Grande do Sul (BR); Ednei Gilberto Primel, Rio Grande do Sul (BR)

(73) Assignee: Petroleo Brasileira S.A.—Petrobras, Rio de Janeiro, RJ (BR)

( * ) Notice: Subject to any disclaimer, the term of this patent is extended or adjusted under 35 U.S.C. 154(b) by 0 days.

(21) Appl. No.: 12/370,883

(22) Filed: Feb. 13, 2009

(65) Prior Publication Data

US 2009/0200230 A1 Aug. 13, 2009

(30) Foreign Application Priority Data

Feb. 13, 2008 (BR) ...................................... 0800141

(51) Int. Cl.
*C02F 3/32* (2006.01)
(52) U.S. Cl. ..................................................... 210/602
(58) Field of Classification Search .................. 210/602
See application file for complete search history.

(56) References Cited

U.S. PATENT DOCUMENTS

| 5,011,604 | A * | 4/1991 | Wilde et al. .................... 210/602 |
| 6,416,993 | B1 * | 7/2002 | Wexler et al. ................. 435/262.5 |
| 6,896,804 | B2 * | 5/2005 | Haerther et al. ............... 210/602 |
| 2003/0213745 | A1 * | 11/2003 | Haerther et al. ............... 210/602 |

OTHER PUBLICATIONS

Derner, Roberto Bianchini et al., "Microalgas, Produtos e Aplicações", Ciência Rural, vol. 36, No. 6, (Nov.-Dec. 2006), pp. 1959-1967.
Gonçalves de Oliveira, Roberto Carlos, "Removal of the Toxic Contaminants of the Liquid Effluents Derived from the Activity of Oil Production in the Sea", Bóletim Técnico Petrobras, vol. 43, No. 2, (Apr.-Jun. 2000), pp. 129-136.

* cited by examiner

*Primary Examiner* — Fred Prince
(74) *Attorney, Agent, or Firm* — Nixon & Vanderhye P.C.

(57) ABSTRACT

A method which improves the quality of effluent from the process of the industrial production of petroleum, usually referred to as produced water. This method makes it possible to reduce the concentration of pollutants in produced water requiring treatment by removing these pollutants through the use of cultures of microalgae that have passed through a process of natural selection and are naturally adapted to the hostile environment offered by produced water.

4 Claims, 3 Drawing Sheets

METHOD FOR REMOVING POLLUTANTS FROM PRODUCED WATER

FIELD OF THE INVENTION

This invention relates to a method for improving the quality of effluent originating from the process of the industrial production of petroleum, which is normally referred to as produced water. More specifically this invention relates to a method through which the concentration of pollutants in produced water can be reduced by removing the said pollutants making use of cultures of microalgae which are naturally adapted to the hostile environment which produced water represents.

BASIS OF THE INVENTION

The growing increase in the study of microorganisms such as microalgae, some fungi (for example yeasts) and bacteria is due to their essential importance in various segments of the economy.

During the last few years there has been great interest in the biotechnological potential of microalgae, and many investigations in this respect have been made in various areas such as nutrition, human and animal health, the production of energy, the production of compounds which are useful in the food, chemical and pharmaceutical industries, and in the treatment of waste water for biological detoxification and the removal of heavy metals, to mention only a few. (Borowitzka, 1993; Certik & Shimizu, 1999; Kirk & Behrens, 1999; Leman, 1997, Bruno, 2001; Grobbelaar, 2004; Richmond, 2004).

In the specific case where microalgae are used to remove pollutants, such as in the treatment of waste water from many industrial processes, some compounds of agricultural benefit which are removed by the microalgae come to be part of the resulting biomass, and this can also be used as a biofertiliser, not only in the context of agriculture.

RELATED ART

There are at the present time various applications which use microalgae to purify domestic and industrial effluents, which can be found in the international scientific literature. Among these mention may be made of:

a) Microalgae Used in the Purification of Domestic Effluents.

It is possible to obtain mixed biomass (microalgae and bacteria) growing in domestic effluents where there is an organic effluent that acts as a source of nutrients for these microorganisms. Domestic effluent is subjected to agitation and exposed to sunlight for a number of days so that adequate algal growth takes place.

At the end of this process, known as secondary treatment, the effluent is separated from the mixed biomass with a low concentration of organic matter and a high content of dissolved oxygen, The microalgae used for this process include the genera *Scenedesmus* sp and *Chlorella* sp (Borowitzka, M & Borowitzka L. Micro-algal biotechnology, 1989).

b) Microalgae Used in the Purification of Industrial Effluents.

There are industrial effluent treatments (tertiary treatment) in which $CO_2$ and other polluting compounds are removed by microalgae located in the sections of energy generating plants from which atmospheric pollutants escape (e.g. thermal power stations).

Cyanobacteria which are capable of promoting the removal of $CO_2$ present in industrial flue gases at temperatures of around 50° C. have recently been isolated. There are industrial effluent treatments which use the ability of microalgae to perform ion exchange to concentrate metal compounds in solution in water, separating the contaminated biomass from the purified liquid effluent at the end of the process. (Derner, R. B., Ohse, S., Villela, M. de Carvalho, S. M. & Fett, R. Ciência Rural, v 36 no. 6, December 2006).

Conventional tertiary treatment procedures without a biological component are mentioned below:

Bubbling with gas ("stripping")
Ion exchange
Membrane filtration
Adsorption on activated carbon
Adsorption on synthetic zeolites.

However, in the context of the oil industry there is a need for the treatment of industrial effluent originating from the production of petroleum, normally referred to as produced water, the treatment of which normally involves the use of suitable facilities and reagents to remove the pollutants present, which in addition to inherent operational costs also incur the costs of the chemical supplies which are required for their operation.

This invention provides an economical and efficient method for removing pollutants from produced water, in addition to representing an advance in industrial processes as far as environmental aspects are concerned.

SUMMARY OF THE INVENTION

This invention comprises a method for removing pollutants from produced water through the growth of microalgae adapted to survive in this type of industrial effluent.

This innovation is based on the discovery that there are microalgae capable of growing and developing under severe conditions—such as those obtaining in produced water—which normally limit the growth of a microalgal culture, in which such severe conditions are characterized by the presence of chemical compounds of known toxicity (e.g. sulphites, phosphates, ammonia, polyaromatic hydrocarbons) in this type of industrial effluent.

DETAILED DESCRIPTION OF THE INVENTION

Figure 1:
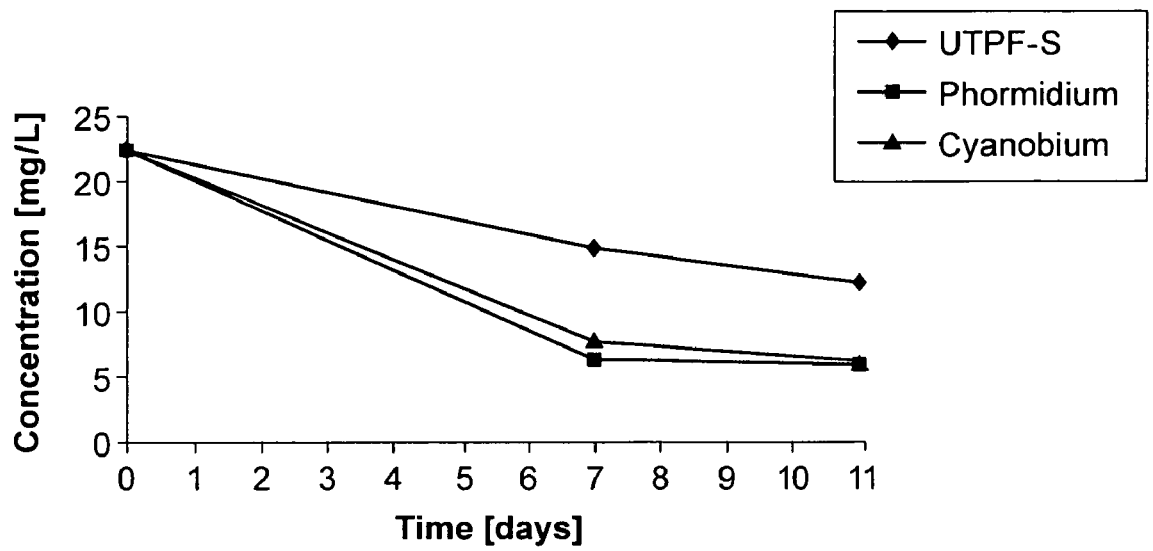
FIG. 1 is a graph showing the decrease in the concentration of ammonia in control produced water against time (in days). This provides evidence of the bioassimilation of ammonia by the microalgae.

This invention relates to the isolation of strains of microalgae whose development has already passed through a natural selection process in the environment in which they are found, and thus makes it possible for them to be used for the treatment of produced water.

After these algae have grown for a specific length of time a fall takes place in the pollutants in produced water due to the metabolic processes of the algae (e.g. photosynthesis), bringing about a substantial improvement in the quality of the produced water, in particular where its toxicity is concerned.

After the biomass of the microalgae present has been removed (by separation processes) the produced water treated in this way is of better quality from the environmental point of view.

In general, the method according to this invention comprises:

a) isolating and identifying strains of microalgae from the region under investigation which are capable of growing in the produced water present b) performing static bioassays (growth tests) in the laboratory to provide evidence of the growth of microalgae in produced water or in mixtures containing conventional culture medium and produced water, and c) conducting chemical analyses which provide evidence of the removal of pollutants (e.g. ammonia and phosphate) present in the produced water over a specific period of time.

According to this invention, in investigations carried out on produced water through the isolation of microalgal strains (originating from the north-east region of Brazil) which have already undergone a natural selection process it has been possible to obtain specific growth rates for the genera *Phormidium* sp and *Cyanobium* sp of the same order of magnitude as those obtained in conventional culture medium and this is a tact which has not yet been clearly and objectively reported in the international scientific literature.

It is important to point out that the method described by this invention has a wide spectrum of application, and can be used for other genera of adapted microalgae (e.g. *Pseudoanabaena* sp, *Amphora* sp, *Monoraphidium* sp, *Chlorella* sp, among others) and in other regions where produced water has different characteristics (e.g. salinity, temperature, pH) from the one mentioned in this document.

Those skilled in the art will be able to carry out investigations to adapt various algal genera to the specific characteristics of the effluent requiring treatment, and make changes, adaptations and choices in respect of the microalgal genera which are most appropriate for the produced water in question.

REPRESENTATIVE EXAMPLE

As previously mentioned, the investigations carried out involving the isolation of microalgal strains that have gone through natural selection process (originating from the north-east region of Brazil) have made it possible to obtain specific growth rates for the genera *Phormidium* sp and *Cyanobium* sp in produced water which surprisingly are of the same order of magnitude as those obtained in conventional culture medium, indicating that they are fully adapted to the medium.

This has made it possible to remove phosphate-containing and nitrogen-containing compounds of known toxicity (e.g. ammonia) from produced water, among other pollutants, reducing their concentrations to levels which are considered permissible by current Brazilian law, after a few days of treatment.

The typical composition of the produced water mentioned has been described by Oliveira, R. C. & Oliveira, M. C., 2000, Boletim técnico PETROBRAS, Rio de Janeiro 43(2); 129-136.

The data included in Tables 1 and 2 illustrate the fall in ammonia concentration in produced water obtained through use of the technique mentioned. In both the experiments there was microalgal growth in those environments, which suggests that the genera mentioned are adapted to the medium, as can be seen through the increase in dry biomass, also shown in Tables 1 and 2.

In order to carry out the bioassays the temperature of the cultures was held at 25° C., and the photoperiod used was 12 hours with a light intensity of 170 $\mu E/m^2.s$ and 12 hours in the dark.

Table 1 below shows the result obtained when *Cyanobium* sp was inoculated into produced water effluent (concentration: 95% produced water+5% H 2 culture medium).

TABLE 1

| Initial concentration of ammonia in the effluent (mg/L) | Final concentration of ammonia in the effluent after 9 days (mg/L) | Removal of ammonia from the effluent after 9 days (%) |
| --- | --- | --- |
| 0.62 | 0.05 | 91.9 |

Increase in the dry biomass of microalgae over the experiment: 146 mg/L.

Table 2 shows the result obtained with inoculating *Phormidium* sp into produced water effluent (concentration: 95% produced water+5% H 2 culture medium)

TABLE 2

| Initial concentration of ammonia in the effluent (mg/L) | Final concentration of ammonia in the effluent after 9 days (mg/L) | Removal of ammonia from the effluent after 9 days (%) |
| --- | --- | --- |
| 0.62 | 0.13 | 79.0 |

Increase in the dry biomass of microalgae over the experiment: 111 mg/L.

At the present time, according to current Brazilian law (CONAMA Decision no. 357 of March 2005) the maximum limit for total amoniacal nitrogen concentration acceptable for discharge in coastal areas is 0.40 mg/L, given the high toxicity which this compound has for marine organisms. It will therefore be seen that growth of the microalgae can lower the ammonia concentration in produced water to levels which are significantly lower than the effluent discharge limits permitted by current Brazilian law.

With a view to providing an additional evaluation of the behaviour of microalgae for the advanced treatment of industrial effluents containing high concentrations of ammonia, bioassays were carried out with produced water charged with ammonia which was deliberately added in a concentration very much higher (by approximately two orders of magnitude) than that recommended as the maximum limit permitted by Brazilian law for discharge into salt water environments.

The data obtained are shown in the graph in FIG. 15 which shows the decrease in the concentration of ammonia in control produced water (produced water following separation by flotation-(UTPF-S)-output water) charged with ammonia in a test without the addition of microalgae and in a test on a sample containing *Phormidium* sp (concentration: 95% by volume of produced water+5% by volume of H 2 culture medium) and a test for a sample containing *Cyanobium* sp (concentration: 95% by volume of produced water+5% by volume of H 2 culture medium).

From the results obtained it will be seen that bioassimilation of ammonia by the microalgae occurred. This process removes a quantity of ammonia greater (more than 110% greater) than that observed in the control sample (UTPF-S) over the same period of time (7 days). This fact is indicative of the enormous potential of microalgae for technological applications of this nature.

In order to evaluate the possibility of using microalgae for the advanced treatment of industrial effluents containing phosphate concentrations above those permitted by Brazilian law for discharge into salt water environments, which is 0.062 mg/L of free phosphorus for class I salt waters, further bioassays were performed using produced water containing phosphate deliberately added in concentrations very much higher (by two orders of magnitude) than the maximum permitted limit.

Figure 2:
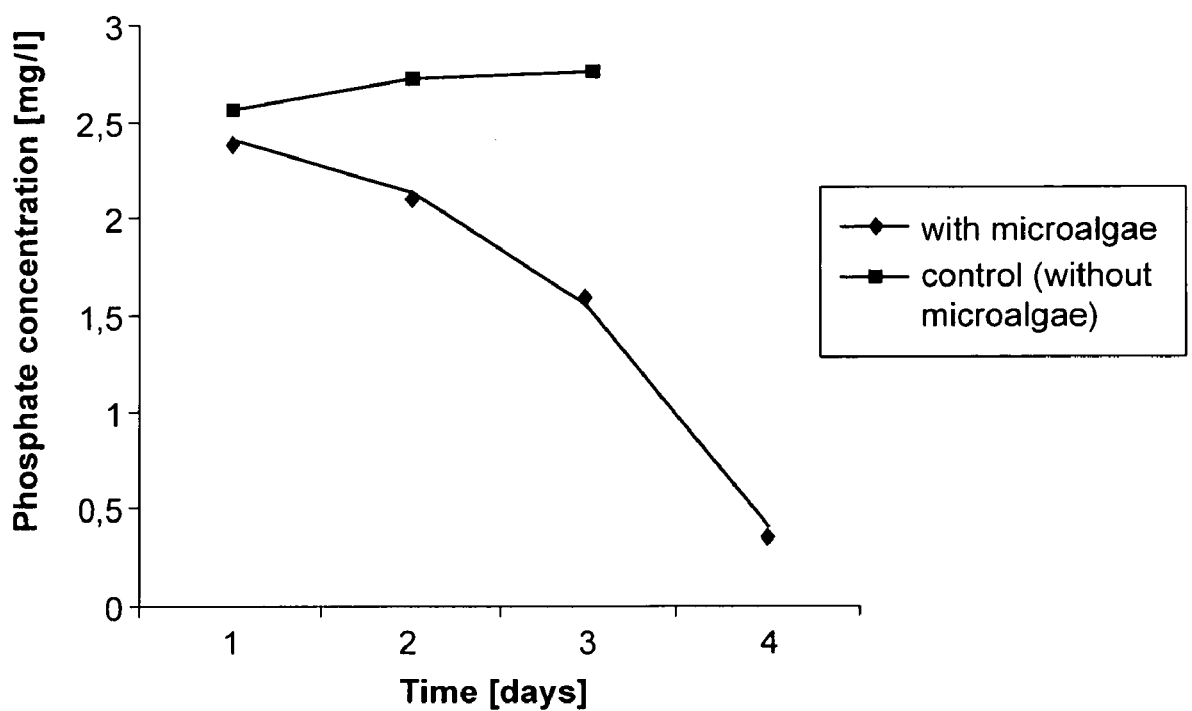
FIG. 2 is a graph showing the decrease in the concentration of phosphate in incoming produced water against time (in days).

The data obtained in this experiment are included Table 3, which shows the result obtained by inoculating produced water charged with phosphate (concentration: 95% produced water+5% H 2 culture medium) with *Cyanobium* sp, and in FIG. 2, which illustrates the fall in the concentration of phosphate added to the produced water obtained using the technique described with the inoculation of *Cyanobium* sp into produced water, for the control sample (produced water prior to separation by flotation-(UTPF-E)-input water) and for samples containing *Cyanobium* sp (concentration: 95% by volume of produced water+5% by volume of H 2 culture medium). It will be seen from the increase in the concentration of chlorophyll in the medium that there was growth of the microalgae.

TABLE 3

| Initial concentration of phosphate in the charged effluent (mg/L) | Final concentration of phosphate in the effluent after 4 days (mg/L) | Removal of phosphate from the effluent after 4 days (%) |
| --- | --- | --- |
| 2.37 | 0.37 | 84.4 |

Increase in the concentration of Chlorophyll over the experiment: 282.4 µg/L.

Tests were carried out using the genus most appropriate to the medium, using input produced water (produced water prior to separation by flotation) and output produced water (produced water after separation by flotation) for samples containing *Cyanobium* sp, the results of which are presented in Tables 4, 5 and 6 below, and illustrated in the graphs in FIGS. 3, 4 and 5.

Table 4 shows the concentration of phosphate in produced water containing H 2 culture medium (5% by volume) with *Cyanobium* sp.

TABLE 4

| Phosphate concentration (mg/L) | Day 1 | Day 2 | Day 3 | Day 4 | Phosphate removal (%) |
| --- | --- | --- | --- | --- | --- |
| Input water | 0.17 | 0.15 | 0.15 | 0.15 | 11.8 |
| Output water | 0.17 | 0.16 | 0.15 | 0.13 | 23.6 |

Table 5 shows the concentration of phosphate in produced water containing H 2 culture medium (25% by volume) with *Cyanobium* sp.

TABLE 5

| Phosphate concentration (mg/L) | Day 1 | Day 2 | Day 3 | Day 4 | Phosphate removal (%) |
| --- | --- | --- | --- | --- | --- |
| Input water | 1.12 | 1.08 | 0.2 | 0.15 | 86.6 |
| Output water | 1.03 | 0.59 | 0.23 | 0.15 | 85.4 |

Table 6 shows the concentration of phosphate in produced water containing H 2 culture medium (50% by volume) with *Cyanobium* sp.

TABLE 8

| Phosphate concentration (mg/L) | Day 1 | Day 2 | Day 3 | Day 4 | Phosphate removal (%) |
| --- | --- | --- | --- | --- | --- |
| Input water | 2.1 | 2.1 | 1.6 | 0.15 | 92.9 |
| Output water | 2.0 | 1.36 | 1.05 | 0.12 | 94.0 |

Figure 3:
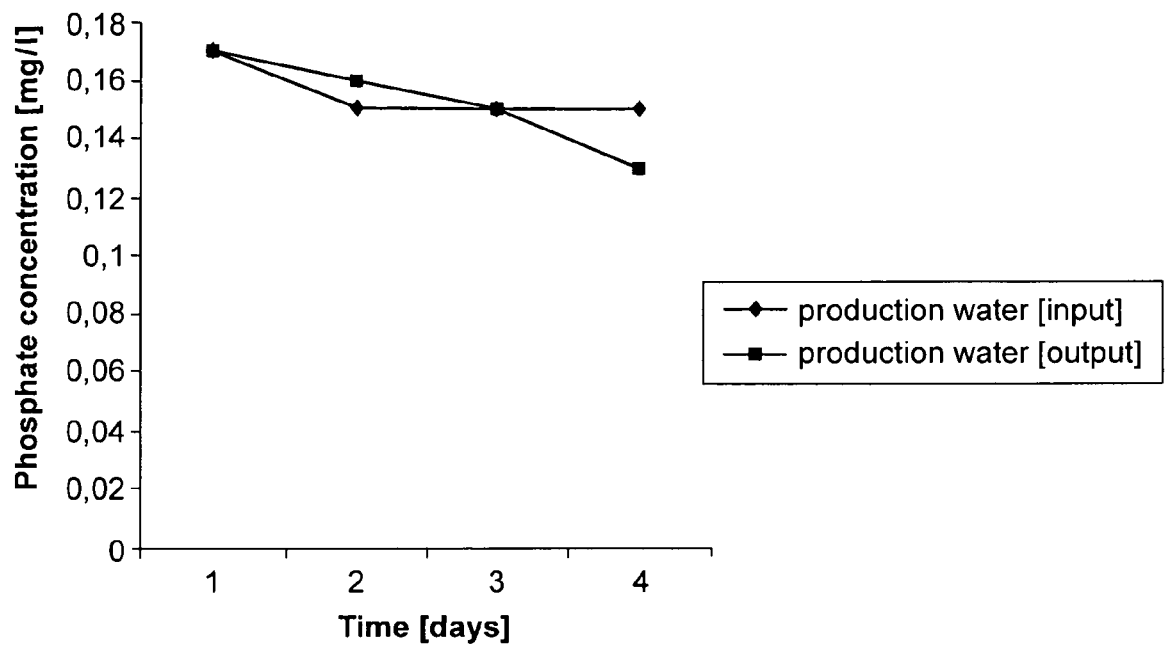
FIGS. 3, 4 and 5 show graphs illustrating the decrease in the concentration of phosphate in produced water against time (in days) for samples containing *Cyanobium* sp.
Figure 4:
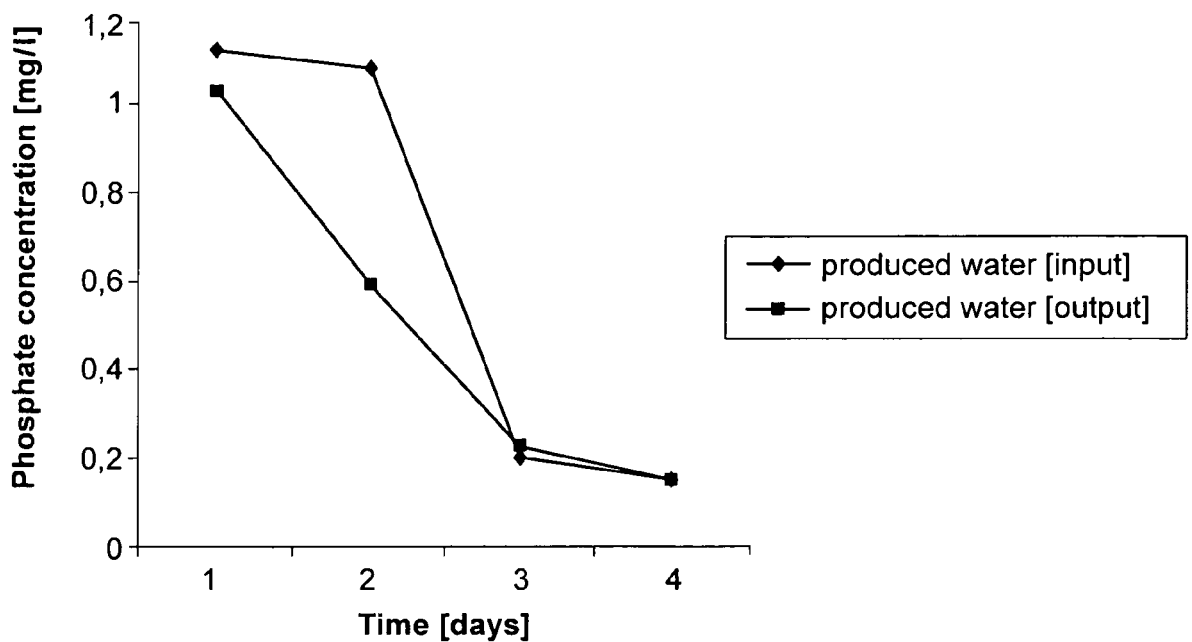

From the results shown in the Tables and revealed in the corresponding graphs in FIGS. 3, 4 and 55 where FIG. 3 shows the decrease in the phosphate concentration in input produced water (produced water prior to separation by flotation) and output produced water (after separation by flotation-(UTPF-S)) for samples containing *Cyanobium* sp (concentration 95% by volume of produced water+5% by volume of H 2 culture medium).

FIG. 4 is a graph showing the fall in phosphate concentration in input produced water (produced water prior to separation by flotation) and output produced water (after separation by flotation (UTPF-S) for samples containing *Cyanobium* sp (concentration 75% by volume of produced water+25% by volume of H 2 culture medium).

Figure 5:
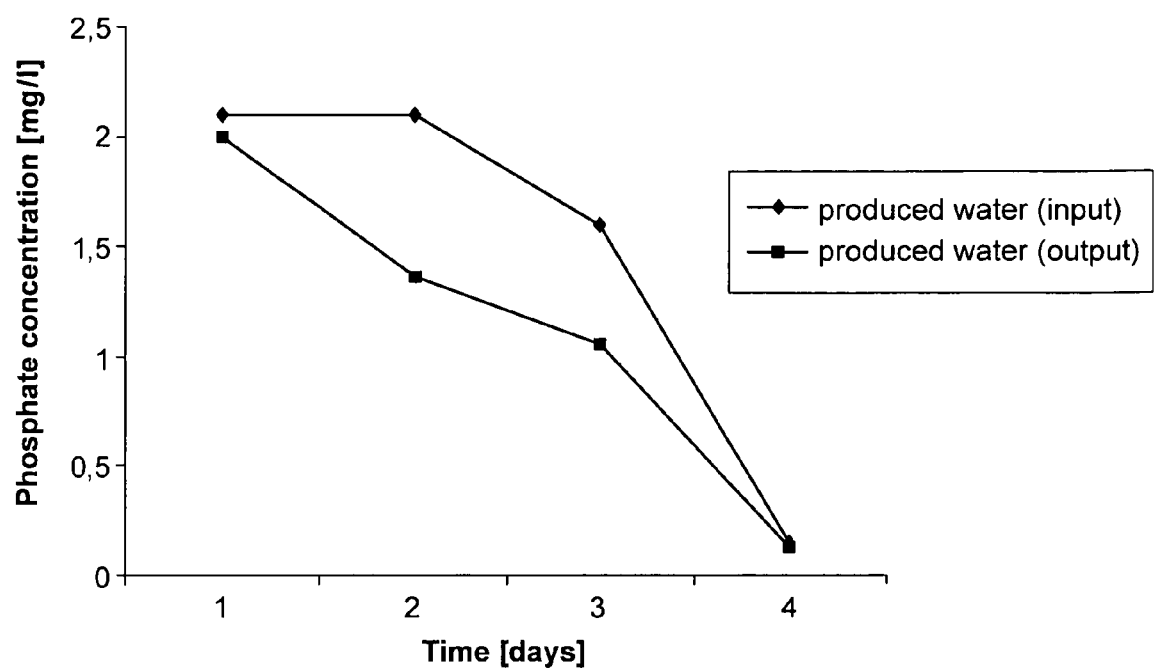

FIG. 5 is a graph showing the fall in phosphate concentration in input produced water (produced water prior to separation by flotation UTPF-E) and output produced water (after separation by flotation) for samples containing *Cyanobium* sp (concentration 50% by volume of produced water+50% by volume of H 2 culture medium).

It will be noted that the addition of microalgae of the genus *Cyanobium sp* produced a quite marked effect in the percentage removal of ammonia and phosphate present in produced water, an effect which is increased as the period for activity of the microalgae is increased, with the result that it can be used as a method for removing these pollutants from produced water in general.

The tests carried out for ammonia and phosphate, presented here and regarded as pollutants present in produced water for the purposes of this invention, represent only one group of pollutants considered in the tests, which can be extended to other chemical species of polluting elements or compounds.

It will be understood that specific tests, both in the context of adapting algal cultures to specific media, and their specific abilities to remove pollutants which are relevant in the context of the produced water in question, may be extended and carried out by those skilled in the art with the object of collecting more specific experimental data in connection with the reduction of desired pollutant levels, which are covered by the spirit and scope of this invention.

All the references mentioned here are included in full, and although this invention has been described in connection with its preferred embodiments and representative examples, the innovative character of the main concept of the invention of the use of microalgae for the removal of pollutants from produced water persists, while those skilled in the art may envisage and apply variations, modifications, changes, adaptations and the like which are necessary and compatible with the working environment in question without however going beyond the spirit and scope of this invention, which are represented by the appended claims.

The invention claimed is:

1. Method for the removal of pollutants from produced water originating from a process of industrial production of petroleum, characterised in that microalgae originating from algal cultures which have passed through a process of natural selection adapting them to the environment provided by the produced water mentioned are used to achieve this said removal of pollutants.

2. Method for the removal of pollutants from produced water according to claim 1, characterised in that the microalgae mentioned are of the genera *Cyanobium* sp and *Phormidium* sp.

3. Method for the removal of pollutants from produced water according to claim 1, characterised in that the microalgae mentioned are of genera *Pseudoanabaena* sp, *Amphora* sp, *Monoraphidium* sp, *Chlorella* sp.

4. Method for the removal of pollutants from produced water according to claim 1, characterised in that is comprises the stages of:

a) isolating and identifying strains of microalgae from the region under investigation which are capable of growing in the produced water present, b) performing static bioassays (growth tests) in the laboratory to provide evidence of the growth of microalgae in produced water or mixtures containing conventional culture medium and produced water, and c) conducting chemical analyses which provide evidence of the removal of pollutants of interest present in the produced water over a specific period of time.

* * * * *